United States Patent [19]

Boher et al.

[11] Patent Number: 5,216,539
[45] Date of Patent: Jun. 1, 1993

[54] DEVICE OF THE MIRROR TYPE IN THE RANGE OF X-UV RAYS

[75] Inventors: Pierre Boher, Yerres; Philippe Houdy, Lardy, both of France

[73] Assignee: U.S. Philips Corp., New York, N.Y.

[21] Appl. No.: 688,621

[22] PCT Filed: Oct. 10, 1990

[86] PCT No.: PCT/NL90/00147

§ 371 Date: May 23, 1991

§ 102(e) Date: May 23, 1991

[87] PCT Pub. No.: WO91/06021

PCT Pub. Date: May 2, 1991

[30] Foreign Application Priority Data

Oct. 13, 1989 [FR] France .................. 89 113423

[51] Int. Cl.$^5$ .......................... G02B 5/28; G21K 1/06
[52] U.S. Cl. ..................... 359/359; 359/360; 378/84
[58] Field of Search ............... 359/350, 359, 360, 361, 359/585, 589; 378/84, 85

[56] References Cited

U.S. PATENT DOCUMENTS

| | | | |
|---|---|---|---|
| 4,684,565 | 8/1987 | Abeles et al. | 378/85 |
| 4,693,933 | 9/1987 | Keem et al. | 428/333 |
| 4,785,470 | 11/1988 | Wood et al. | 378/84 |
| 4,786,128 | 11/1988 | Birnbach | 378/85 |
| 4,969,175 | 11/1990 | Nelson et al. | 378/84 |
| 5,042,059 | 8/1991 | Watanabe et al. | 378/85 |
| 5,052,033 | 9/1991 | Ikeda et al. | 378/84 |

OTHER PUBLICATIONS

A. V. Vinogradov & B Ya. Zeldovich, "X-ray & far uv multilayer mirrors: principles and possibilities", Applied Optics, Jan. 1977, vol. 16, No. 1, pp. 89-93.

Ruterana et al., "The Structure of Ultrathin C/W and Si/W Multilayers for High Performance in Soft X-ray Optics", J. Appl. Phys., 65, (10), 15 May 1989, pp. 3907-3913.

Boher et al., "Interface Analysis of Sputtered W-C, Rh-C and Ni-C Multilayers for Soft X-ray Applications", Thin Solid Films, 175 (1989) pp. 161-171.

A. V. Vinogradov et al., "Multilayer mirrors for x-ray and for ultraviolet radiation", Opt. Spectrosc., vol. 42, No. 4, Apr. 1977, pp. 404-407.

*Primary Examiner*—Bruce Y. Arnold
*Assistant Examiner*—Martin Lerner
*Attorney, Agent, or Firm*—Jack D. Slobod

[57] ABSTRACT

Device of the mirror type in the range of X-UV rays, comprises a periodic stack, on a support, of a system of superimposed layers, which system includes a lower layer of a first heavy element reflecting at the wavelengths of application of the mirror, and an upper spacer layer of a light element which has low optical absorption at these wavelengths. The system of superimposed layers comprises, between the lower layer and the upper layer, an intermediate layer of a second heavy element reflecting at the wavelengths of application to form a three-layer system. The heavy elements are selected to form together with the spacer element first and second pairs, first of which has greater absorption at the wavelengths of application and exhibits a ratio of contrast of real and complex indices lower than the other second pair. The heavy element of the first pair forms the lower layer of the three-layer system, the intermediate layer being composed of the heavy element of the second pair.

15 Claims, 10 Drawing Sheets

DEVICE OF THE MIRROR TYPE IN THE RANGE OF X-UV RAYS

BACKGROUND OF THE INVENTION

1. Field of the Invention

The invention relates to a device of the mirror type in the range of X-UV rays, comprising the periodic stack, on a support, of a so-called system of superimposed layers, which system includes a lower layer of a so-called first heavy element reflecting at the wavelengths of application of the mirror, and an upper layer of a light element referred to as a spacer which has low optical absorption at these wavelengths.

The invention is applied, for example, in the construction of spectroscopes, microscopes or telescopes using X-rays, and any apparatus requiring the construction of X-ray mirrors exhibiting coefficients of reflection which are as great as possible, or again in the construction of monochromators, which require mirrors which furthermore exhibit a good selectivity.

2. Description of the Prior Art

Mirrors intended for the X-ray range are known from the publication entitled "Interface analysis of sputtered W/C, Rh/C and Ni/C multilayers for soft X-ray applications" by P. BOHER, Ph. HOUDY and Cl. SCHILLER in "Thin Solid Films, 1989, p. 175".

This publication teaches that in order to construct mirrors in the X-ray range, it is necessary to form periodic stacks of systems of two layers, one of which consists of a light element which has low absorption and which is generally designated under the name of spacer, and the other layer of which consists of a reflecting heavy element.

The cited publication teaches that these two layers may be selected from among the pairs W-C, Rh-C, and Ni-C, in which carbon is the spacer element, and tungsten, rhodium or nickel is the reflecting heavy element. The pair W-C is that which, at the present time, is best known.

The thickness of the system of two layers, or 1 period thickness, is of the order of the operating wavelength, that is to say of a few nm in the X-ray range.

This publication also teaches that the two parameters which have the greatest influence on the reflectivity are:

the roughness of the interfaces of the layers,
the reproducibility of the thicknesses.

It is stated that the reproducibility of the thicknesses is essentially an apparatus problem, while the roughness of the interfaces is dependent upon the intrinsic properties of the materials selected to construct the layers.

Thus, according to this publication, the W-C interface exhibits a roughness of the order of 0.4 nm, while the C-W interface is almost perfect.

The case of the pair Rh-C is more complex. It appears that the rhodium contaminates the carbon layer by diffusion, while the carbon reduces the intrinsic roughness of the Rh layer. The result of this is that the C-Rh interface exhibits a thickness of the order of 0.5 nm, and is followed by a pure rhodium layer.

The case of the pair Ni-C is the most complex. On the one hand, an intense interdiffusion of the nickel into the carbon appears, and on the other hand the C-Ni interface likewise appears to be controlled by the interdiffusion of the carbon into the nickel, even after a deposit thickness of 2 nm.

It is also known to construct mirrors for X-rays from the publication entitled "The structure of ultra-thin C/W and Si/W multilayers for high performance in soft-X-ray optics" by P. RUTERANA et al. in "J. Appl. Phys. 65 (10) May 15, 1989" p. 3907-3913.

According to this document, mirrors for X radiation are constructed by means of multilayers formed from the pair silicon-tungsten. In this pair, the silicon is the spacer element and the tungsten is the reflecting heavy element. It is also taught that in order to improve the reflectivity it is necessary to minimize the interface roughness. The materials of the pair are selected for this purpose by utilizing the coalescence as a criterion. A low coalescence thickness promotes the production of a minimum interface roughness.

Now, it is known to the person skilled in the art that the wavelength of application of the mirror is linked to the choice of the spacer element—reflecting element pair; in other words, for a given application and a defined source of X-rays, the selectivity and the reflectivity of the mirror are determined essentially by the selection of the materials of the two-layer system.

However, on the other hand, as demonstrated by these cited documents, the materials which form the best candidates for the construction of a mirror at a given wavelength, for a selected application, may in reality not be appropriate for a satisfactory industrial application, by reason of the fact that they exhibit interface roughnesses or defects linked to the interdiffusion.

SUMMARY OF THE INVENTION

The object of the present invention is to provide a device of the mirror type as defined in the preamble, the technical features of which and the optical properties of which are improved in relation to those of the devices formed by the periodic stack of a two-layer system.

Thus, an object of the invention is to provide a device, the reflectivity of which is improved in relation to that of known devices.

A further object of the invention is to provide a device in which the surface roughness or the interdiffusion is reduced so that these defects no longer prevent the use of the materials which are best suited to the selected operating wavelength.

These objects are achieved by means of the device described in the preamble and furthermore characterized in that the system of superimposed layers comprises, between the lower layer and the said upper layer, an intermediate layer of a so-called second heavy element reflecting at the wavelengths of application to form a three-layer system, in that the heavy elements are selected to form together with the spacer element two pairs, one of which, referred to as the first pair, has greater absorption at the wavelengths of application and exhibits a ratio of contrast of real and complex indices which is lower than the other pair referred to as the second pair, and in that the heavy element of this first pair is selected to construct the lower layer of the three-layer system, the intermediate layer being composed of the heavy element of the second pair.

Under these conditions, the reflectivity of the mirror is improved in relation to what would be the reflectivity of a mirror formed from the same number of systems of layers, the latter being composed of the better one of the two heavy element-light element pairs.

In an embodiment of the invention, this device is characterized in that the heavy elements and the light element are selected so that the potential reflectivities of the pairs of the three-layer system are equivalent.

In this embodiment, the reflectivity of the mirror is further improved.

In an embodiment of the invention, this device is characterized in that the heavy element of the intermediate layer is selected from among those which exhibit, together with the heavy element of the lower layer and the light element of the upper layer, the lowest interdiffusion and a minimum interface roughness.

In this embodiment, the performance levels of the mirror show the best approach to the expected theoretical performance levels.

BRIEF DESCRIPTION OF THE DRAWING

The invention will be better understood by means of the following description, which is illustrated by the accompanying diagrammatic figures, in which.

DESCRIPTION OF THE PREFERRED EMBODIMENT

Figure 1A:
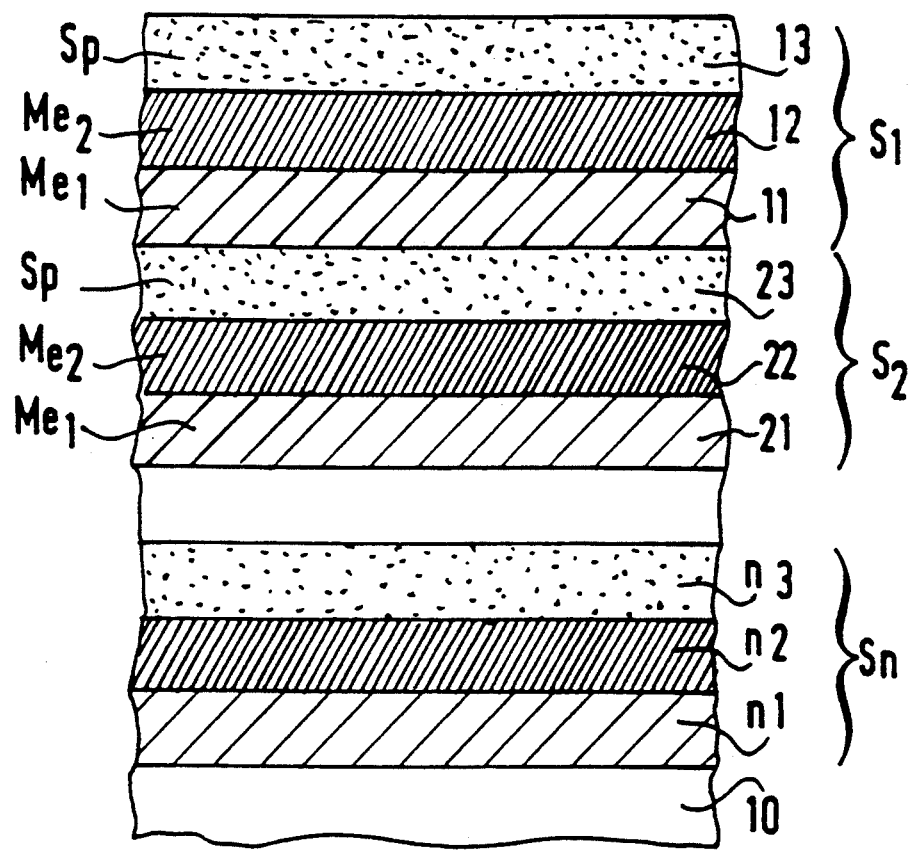
FIG. 1a represents the periodic stack, on a support, of n three-layer systems according to the invention, forming a mirror for X-UV radiation.

As shown in FIG. 1a, a mirror operating in the range of X-UV rays, for example between 1 and 20 nm, consists of a periodic stack of so-called layer systems, $S_1$, $S_2$, ... $S_n$.

Figure 1B:
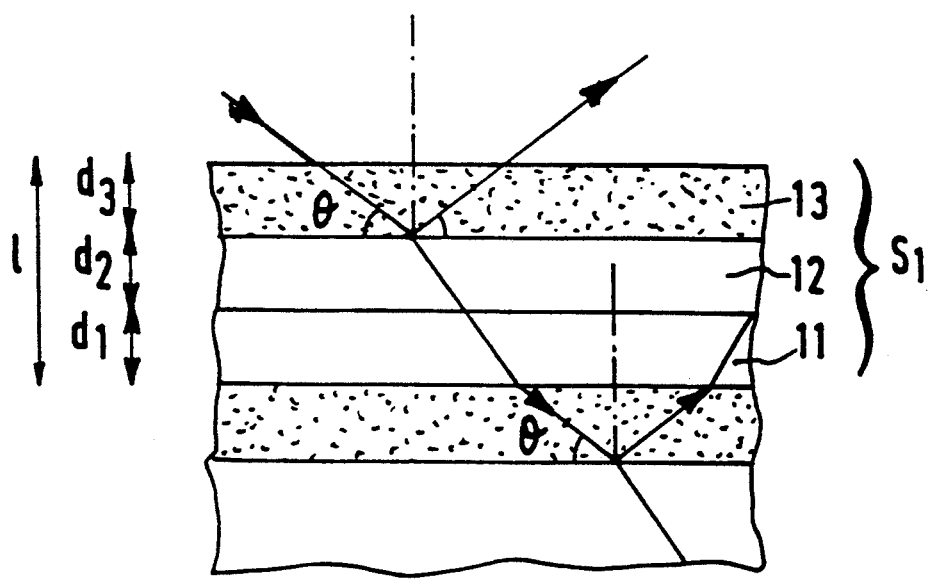
FIG. 1b represents the path of the light beams in a three-layer system.

Each layer system, for example $S_1$, comprises, as shown in FIG. 1b, a lower layer 11, of thickness $d_1$, made of a first heavy material, which exhibits a high density of electrons, reflecting within the range of wavelength $\lambda$ of application of the mirror, an intermediate layer 12, of thickness $d_2$, made of a second heavy material likewise reflecting within this range of wavelength $\lambda$, and an upper layer 13 of thickness $d_3$, made of a light material designated as a spacer.

The dielectric susceptibility $\epsilon$ of a material is expressed in a manner known to the person skilled in the art by the relation (1):

$$\epsilon = 1 - \delta - i\beta \tag{1}$$

where $\delta$ and $\beta$ are the real and complex indices of the material respectively.

Now, in the X-UV range, the indices $\delta$ and $\beta$ are virtually proportional to the atomic number Z of the element forming the material of a layer, this being the case outside the regions of singularity where, for example in the case of carbon, an absorption defect is found, corresponding to the $K\alpha$ line, at the wavelength $\lambda = 4.47$ nm.

Thus, heavy materials are understood to mean the materials consisting of an element, the atomic number Z of which is high in the periodic table, and light materials are understood to mean the materials consisting of an element, the atomic number Z of which is low. The light materials will be found in particular in the first two rows of the periodic table and the heavy materials in the other rows. In the case of the light materials, the indices $\delta$ and $\beta$ of the relation (1) have low values.

Figure 2A:
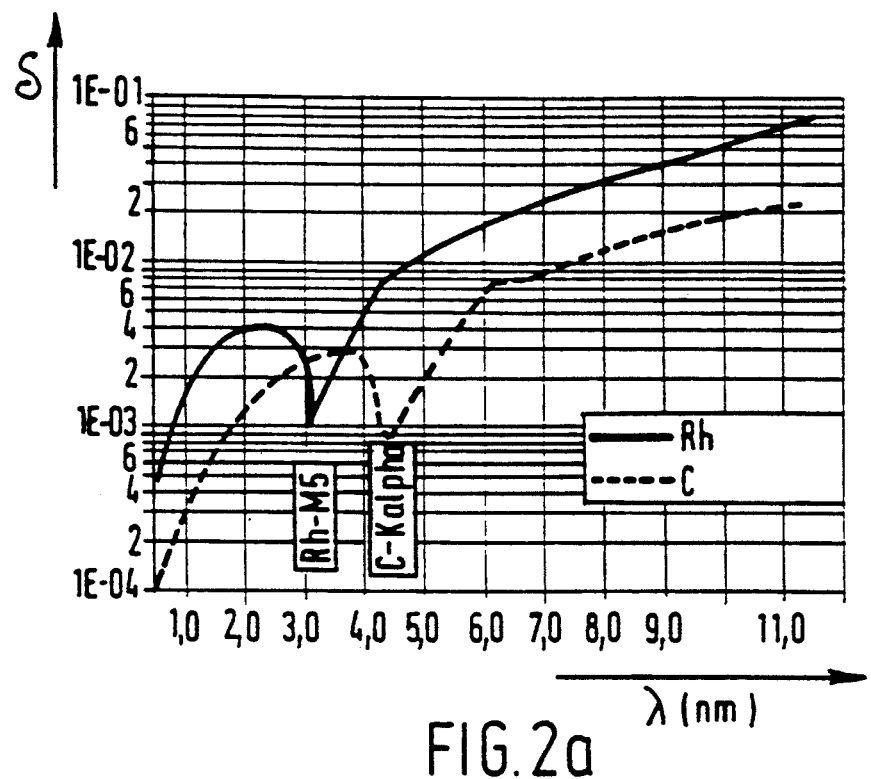
FIG. 2a and 2b represent respectively the real and imaginary indices, as a function of the wavelength, of the element Rh in solid lines and C in broken lines.
Figure 2B:
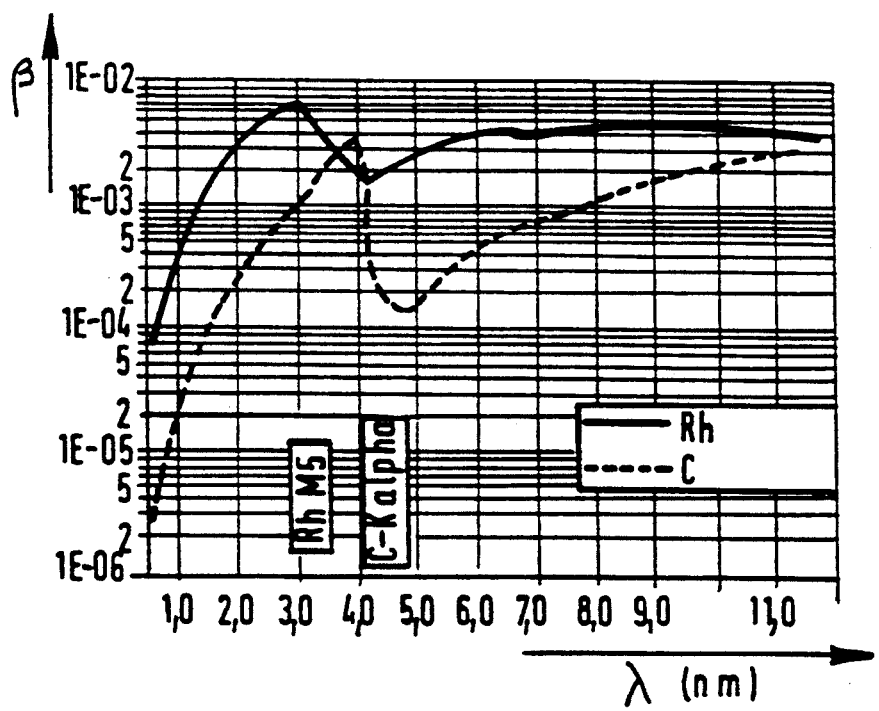

By way of example, FIG. 2a shows the real index $\delta$, of carbon in broken lines and of rhodium in solid lines respectively; FIG. 2b shows the complex index $\beta$ of carbon in broken lines and of rhodium in solid lines respectively.

This system of layers exhibits a thickness L $$L = d_1 + d_2 + d_3 \tag{2}$$

which is the thickness of the stacking period of the system $S_1 \ldots S_n$ of layers to construct the mirror, and which is of the order of the wavelength of application, this being so for the purpose of being able to use this mirror under non-grazing incidence conditions. This condition demands very small thicknesses, of the order of a few nanometers, for wavelengths of application $\lambda$ which are within the range from 1 to 100 nm.

The sources which require mirrors operating within this wavelength range are new sources of X-UV radiation (such as synchrotrons, storage rings ... ). The various fields of applications are, for example, spectroscopy, X-ray lithography, X-ray telescopes etc., which require mirrors having a high coefficient of reflection.

As has been seen previously, the reflectivity and the selectivity of mirrors are dependent upon a certain number of parameters which include the following: the selection of the materials, the regularity of thickness along the entire stack, the roughness of the layers at the interfaces, and the purity of the materials.

It appeared in the prior art that the W-C two-layer system could have a beneficial industrial application, since, being easy to construct with a low interface roughness and a low interdiffusion. However, this W-C two-layer system is limited to the wavelength range of around 4.4 nm, with a very small passband and a theoretical reflectivity of the order of 44% (see Table I).

Now, in practice, the person skilled in the art is aware that the reflectivities which are actually obtained are of the order of one half of the theoretical reflectivities, the value of which is given by computation.

For this reason, the three-layer system according to the present invention offers great advantages in the construction of X-UV mirrors. It permits:

on the one hand, the selection of the materials which result in an increase in the theoretical reflectivity, and thus an increase in the reflectivity which is actually obtained, on the other hand, the introduction of a material selected from among those which exhibit a low interdiffusion and a low roughness at the interfaces; this reduces the difference between the actual value and the theoretical value of the reflectivity, and thus increases the reflectivity which is actually obtained.

In fact, the increase in the number of parameters which are associated with the construction of three-layer system mirrors permits a greater freedom in the selection of the materials and prevents a situation in which the person skilled in the art is compelled to make use, for the purpose of constructing two-layer system mirrors of known type, either of two materials which are technologically compatible but which form a two-layer system of low theoretical reflectivity, or of two materials of high theoretical reflectivity but which form a technologically unfavorable two-layer system.

At the wavelength $\lambda = 4.47$ nm, corresponding to the K$\alpha$ emission line of carbon, Table I gives the characteristics associated with various two-layer systems. In this table, $\beta$ is the complex index defined by the relation (1); $R_{max}$ is the maximum theoretical reflectivity which may be expected from a pair of given materials, as described in the prior art, that is to say, comprising a lower layer made of a heavy material and an upper layer consisting of carbon as spacer; $N_{opt}$ is the theoretical optimal number of layers to obtain $R_{max}$ under normal incidence.

It will be shown hereinbelow how to select the materials and how to arrange the layers in the three-layer system in order to obtain a better reflectivity, a greater quantity of integrated light, and a greater facility of construction of the mirrors than according to the prior art.

A first publication by A. V. Vinogradov and B. Y. Zeldovich, in Applied Optics, Vol. 16 89 (1977), discloses mathematical means for resolving the equation of propagation in a structure having a profile of periodic indices, these being means which permit, by making simplifying hypotheses, the creation of a literal expression for the reflectivity of a mirror as already known from the prior art, that is to say incorporating periodic two-layer systems, this being the case as a function of the parameters of the mirror, namely the period, the thickness ratio of the two materials and the number of periods of the two-layer systems, and under normal incidence conditions.

A second publication by the same authors, in "Optic. Spectrose Vol. 42, No. 4, April 1977, pp. 404-407" discloses identical mathematical means for resolving the same equations under conditions in which the incidence is no longer normal but oblique. Just as previously, the structure of the mirrors includes two-layer systems, but on account of the oblique incidence, the total number of layers required is reduced by a factor $\cos^2\theta$, where $\theta$ is the angle of incidence. The maximum reflectivity is the same as in the case of normal incidence.

This type of computation permits the determination, in a single step and a priori, of the parameters of the system which lead to the theoretical performance levels desired for the mirror (reflectivity, selectivity); this constitutes an advance with respect to the type of computations referred to as interference computations, which are moreover part of the general knowledge of the person skilled in the art, by means of which it was only permitted to establish a posteriori the degree of theoretical performance levels of a mirror, the parameters of which were selected empirically and which could be improved only in several stages by successive approximations.

It will be noted, first of all, that in the range of X-UV rays, for example for wavelengths $\lambda$ within the range between 1 nm and 20 nm, all the materials have a dielectric susceptibility, which is designated e, linked by the relation (3) $|\epsilon - 1| << 1$ (3) The reflectivity of a solid material is thus very low, that is to say of the order of $10^{-4}$, apart from very grazing incidences. For this reason, it is essential to construct the mirrors used in the wavelength range by means of multilayer systems, in order to be able to operate at non-grazing incidences. A multilayer mirror incorporating two-layer systems itself permits the achievement of a gain in reflectivity of approximately $10^3$ in relation to a mirror composed of a solid material. According to the invention, the aim will be to optimize these performance levels.

It will then be noted that the dielectric susceptibility $\epsilon(Z)$ is periodic in the Z direction perpendicular to the layers.

In the text which follows, use will be made of the following notation: Im for "imaginary part of" $R_e$ for "real part of" B and C the ratios of thickness $d_1$, $d_2$ and $d_3$ of the materials 11, 12 and 13 defined by the relations (4) and (5).

$$B = \frac{d_1}{d_1 + d_2 + d_3} = \frac{d_1}{L} \qquad (4)$$

$$C = \frac{d_2}{d_1 + d_2 + d_3} = \frac{d_2}{L} \qquad (5)$$

Figure 3A:
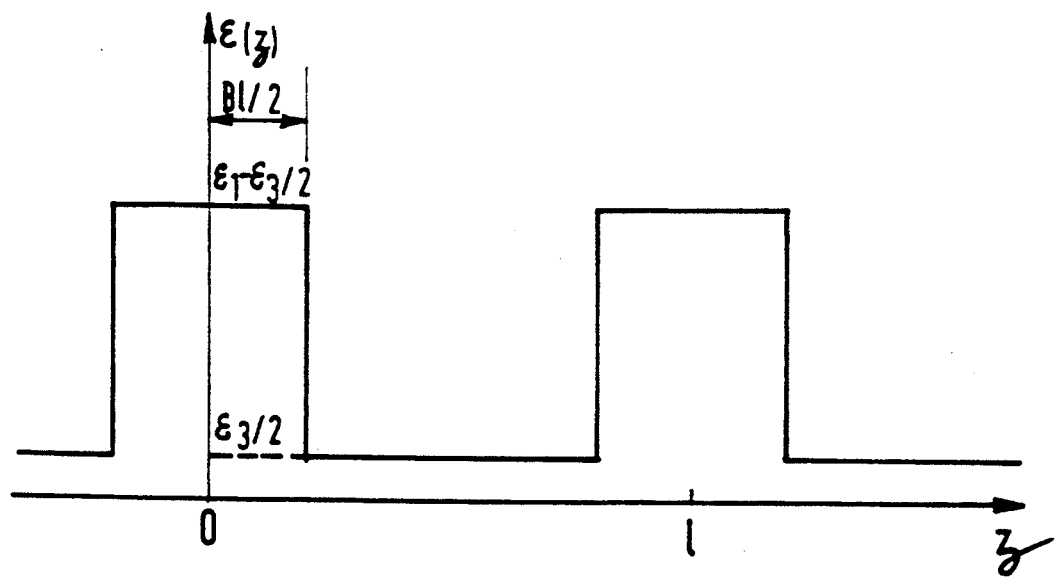
FIG. 3a to 3c represent respectively the complex index profiles in each one of the pairs and in the three-layer system.
Figure 3B:
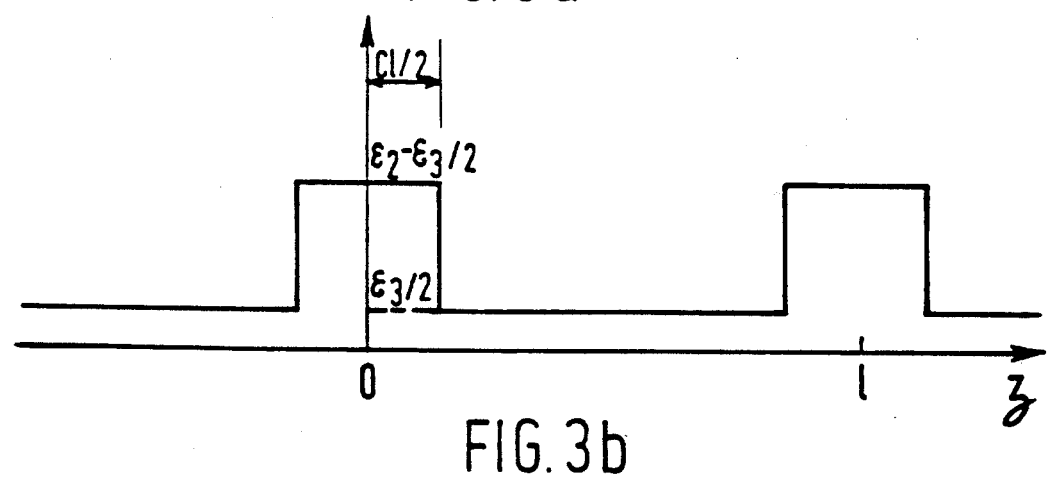
Figure 3C:
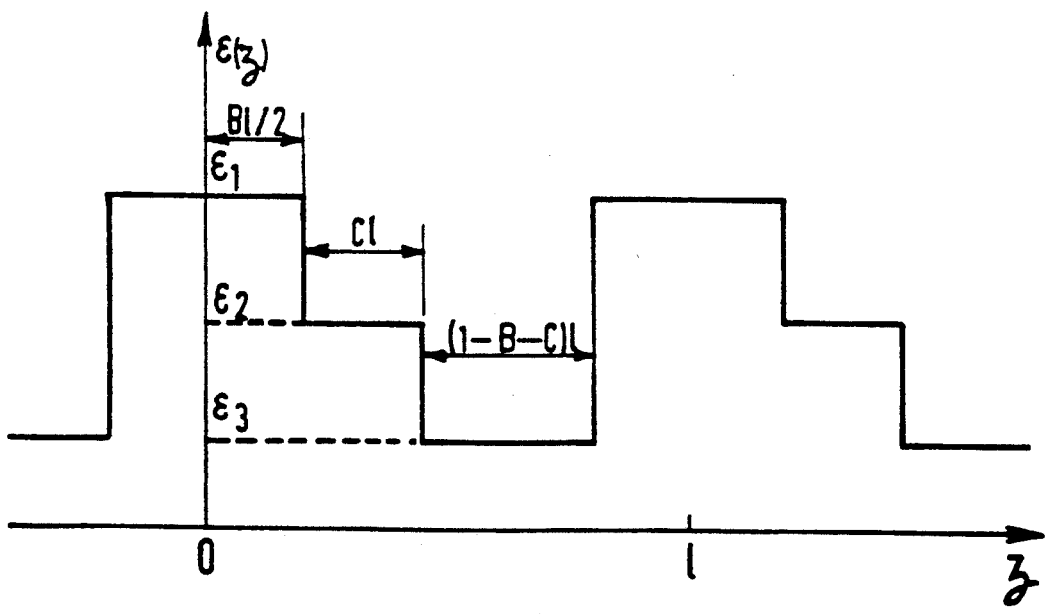

In the case of the mirror consisting of the periodic stack of three-layer systems according to the invention, the complex-index profile is shown in FIG. 3c.

In physical terms, in the case of a system incorporating three materials, the Z-dependence of the dielectric susceptibility may be represented as the sum of two dependencies shown in FIG. 3a and FIG. 3b. The profile of FIG. 3c is then the sum of the profiles of FIG. 3a and 3b. Consideration is given to the case where the materials of the layers 1 and 2 are heavy, the material of the layer 3 is light, and where the relations (6) and (7) are satisfied:

$$Im\ \epsilon_1 > Im\ \epsilon_3 \qquad (6)$$

$$Im\ \epsilon_2 > Im\ \epsilon_3 \qquad (7)$$

these being relations in which : $\epsilon_1$, $\epsilon_2$ and $\epsilon_3$ are the respective dielectric susceptibilities of the materials of the layers 11, 12 and 13.

It will be noted that in the case dealt with by the Vinogradof publications, the computations are made in respect of two-layer systems and which are therefore symmetric.

According to the invention, the computations are made in respect of three-layer systems, which are entirely asymmetric and therefore mathematically more difficult to study.

A digital simulation program was therefore used to compute the theoretical reflectivity of a mirror composed of three-layer systems.

In the most general case, the materials of the three-layer system may be characterized by two contrasts of absorption $\alpha_1$ and $\alpha_2$ given by the relations (8) and (9).

$$\alpha_1 = \frac{Im\epsilon_1}{Im\epsilon_3} - 1; \tag{8}$$

$$\alpha_2 = \frac{Im\epsilon_2}{Im\epsilon_3} - 1 \tag{9}$$

and by two comparison ratios of real and imaginary indices $T_1$ and $T_2$ given by :

$$T_1 = \frac{Re(\epsilon_1 - \epsilon_3)}{Im(\epsilon_1 - \epsilon_3)}; \tag{10}$$

$$T_2 = \frac{Re(\epsilon_2 - \epsilon_3)}{Im(\epsilon_2 - \epsilon_3)} \tag{11}$$

In order to achieve the objects of the invention, a study was carried out on the theoretical performance levels which can be expected from a three-layer system by fixing one pair $(\alpha_1, T_1)$ and varying the other pair $(\alpha_2, T_2)$. It then appeared that there were cases where the theoretical maximum reflectivity of the three-layer system formed of two superimposed layers of heavy materials surmounted by a spacer was improved in relation to that of the better one of the two-layer systems consisting of one of the two heavy materials and of the same spacer.

It will be shown hereinbelow how to select the materials and how to arrange them in order to obtain this improvement in the reflectivity.

The process for effecting this selection comprises the series of following steps :

a) in the ($\alpha$, T) plane, theoretical curves are formed of the maximum isoreflectivity, that is to say curves along which the reflectivity R is both maximum ($R_{max}$) and identical for heavy material (Me)-light material (Sp) pairs considered as forming Me-Sp tow-layer systems.

In a general way, these curves are dependent neither upon the wavelength nor upon the spacer material 13.

However, for each selected wavelength of application, the person skilled in the art will first of all seek the light material to form the upper layer 13 or spacer of the three-layer system. This layer must be constructed by means of an element of the periodic table which exhibits an absorption minimum for the given wavelength.

Thus, for example, the person skilled in the art is aware that (see FIG. 2a and 2b) at the wavelength $\lambda = 4.47$ nm which corresponds to the K$\alpha$ emission line of carbon, a sudden reduction in the absorption of carbon is observed : at this wavelength, the indices $\beta$ and $\delta$ are small.

In another example, at the wavelength $\lambda = 6.67$ nm, which corresponds to the K$\alpha$ line of boron, a spacer will preferably be selected which will include boron such as, for example, boron carbide B$_4$C, and which will exhibit an absorption minimum at this wavelength.

According to the aforegoing, it is therefore particularly beneficial to select carbon as spacer material or layer 13 of the three-layer system when the wavelength of application selected for the mirror is $\lambda = 4.47$ nm. The characteristics for forming the curves of maximum isoreflectivity provided for in this step a), at the wavelength $\lambda = 4.47$ nm, with carbon as spacer element, are given in Table I.

To plot these curves, due consideration is given to the fact that the indices of a given pair of materials Me-Sp entirely determine a point in the ($\alpha$, T) plane and thus the reflectivity $R_{max}$ which can be achieved by means of this pair of materials.

Figure 4A:
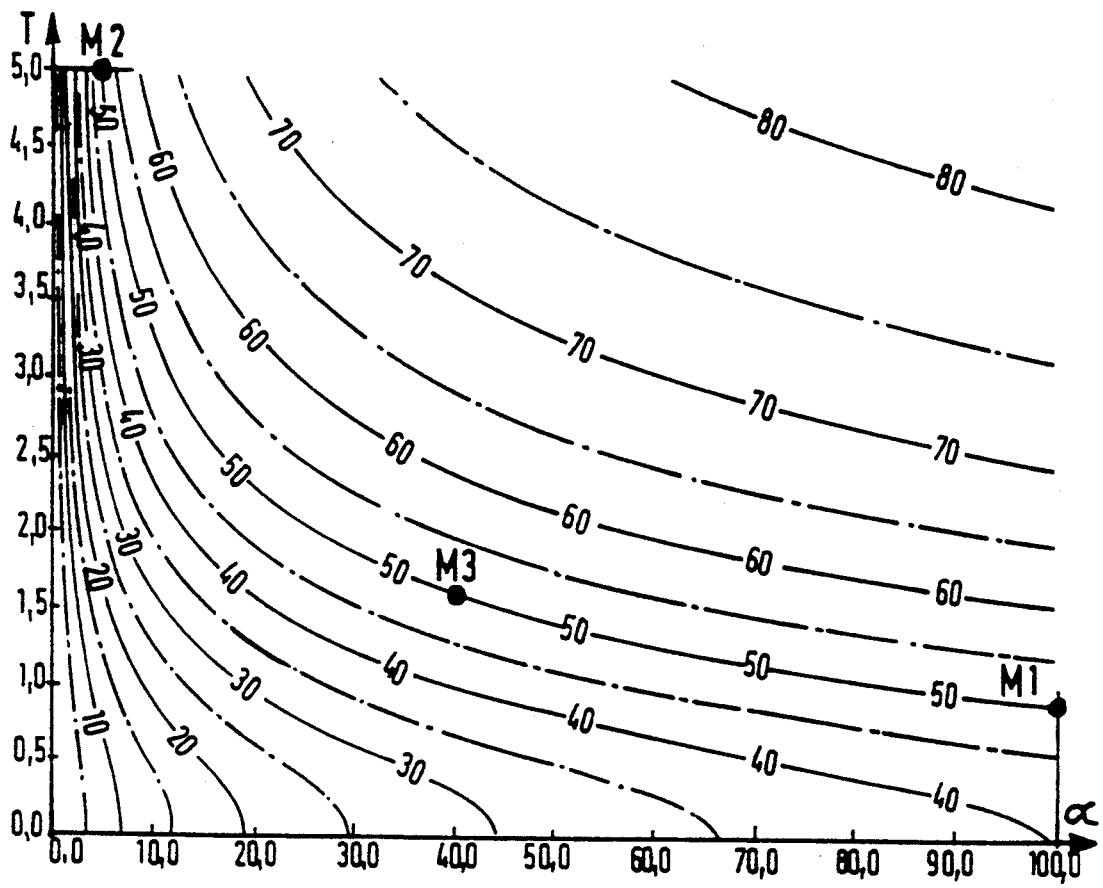
FIG. 4a represents the isoreflectivity lines in the plane $(\alpha, T)$ and FIG. 4b the real position in this plane of Me-carbon pairs, of which only the heavy element Me is indicated, the light element being in all cases carbon, at $\lambda = 4.47$ nm.

FIG. 4a represents these curves of maximum isoreflectivity $R_{max}$, the absorption contrast o being plotted on the abscissa and the index contrast ratio T being plotted on the ordinate. These layers are plotted with an increment of 5%. They show that the maximum reflectivities are obtained when the Me-Sp pair exhibits both a high index contrast ratio T and a low absorption contrast $\alpha$. They also show that the same reflectivity (for example 50%) may be obtained if the Me-Sp pair exhibits a low index contrast ratio T and a high absorption contrast $\alpha$. The first case is, for example, presented in concrete form by the point M$_2$ of FIG. 4a, and the second case by the point M$_1$ of this same figure. The point M$_3$, which is likewise on the curve of isoreflectivity 50% corresponds to intermediate values of $\alpha$ and T.

Figure 4B:
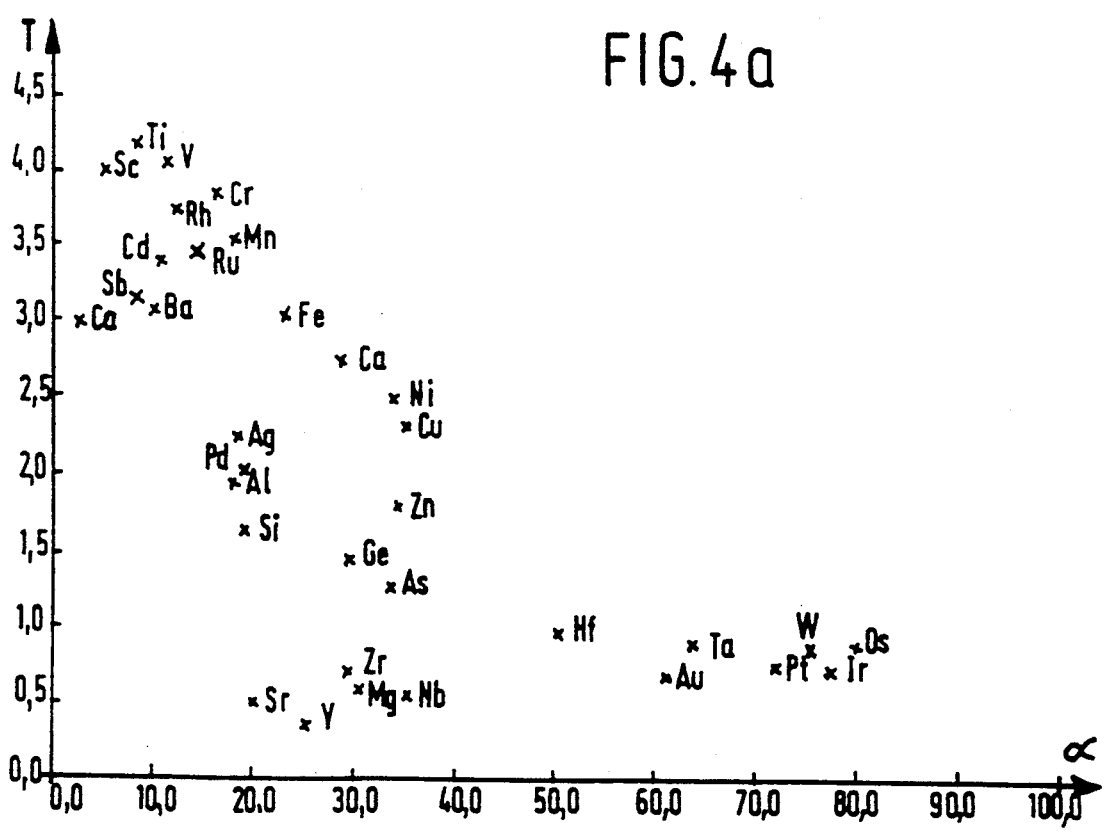

FIG. 4b shows the posit on in the ($\alpha$, T) plane of a few actual Me-Sp pairs in which the spacer is carbon, and for the wavelength of the K$\alpha$ line of carbon.

It is found, on inspecting FIG. 4b, that there are, at this wavelength and under the conditions cited, three large ranges permitting the performance of the selection of the heavy material associated with the carbon to obtain a maximum reflectivity.

a first range where :

T is low $\alpha$ is high and which comprises, in particular, the Me-carbon pairs in which the heavy material is inter alia : tungsten (W), osmium (Os) or platinum (Pt), that is to say the heavy materials with the highest atomic numbers;

a second range where :

T is high $\alpha$ is low and which comprises, in particular, the Me-carbon pairs in which Me is inter alia : thallium (Tl), rhodium (Rh) or chromium (Cr);

a third range where

T and $\alpha$ have mean values corresponding to Me selected from among, inter alia, nickel (Ni), cobalt (Co), etc.

Superimposition of FIG. 4a and 4b, which are drawn for this purpose to the same scale, gives the maximum reflectivity which may be expected by using an Me-Sp two-layer system to form the multilayer mirror, with the material indicated in FIG. 4b as lower layer and carbon as spacer, at $\lambda = 4.47$ nm.

Figure 5A:
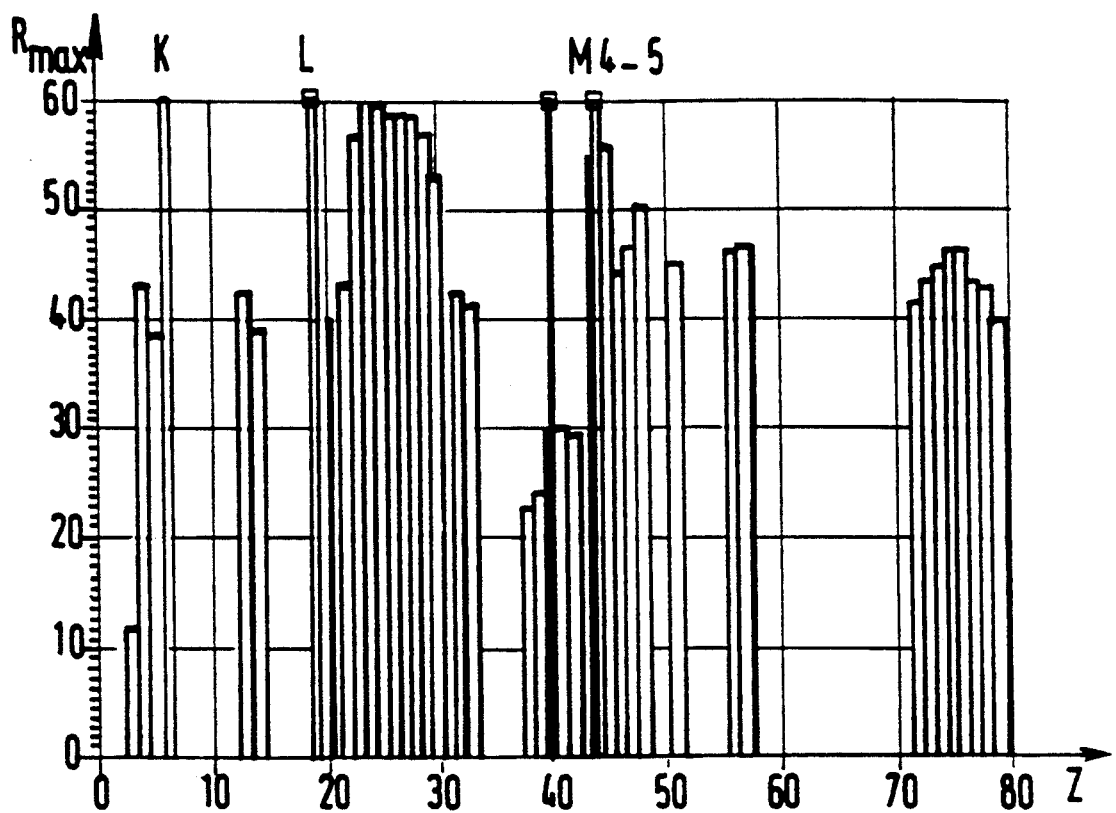
FIG. 5a represents the maximum reflectivities $R_{max}$ of Me-C pairs as a function of the atomic number Z of the heavy element Me.
Figure 5B:
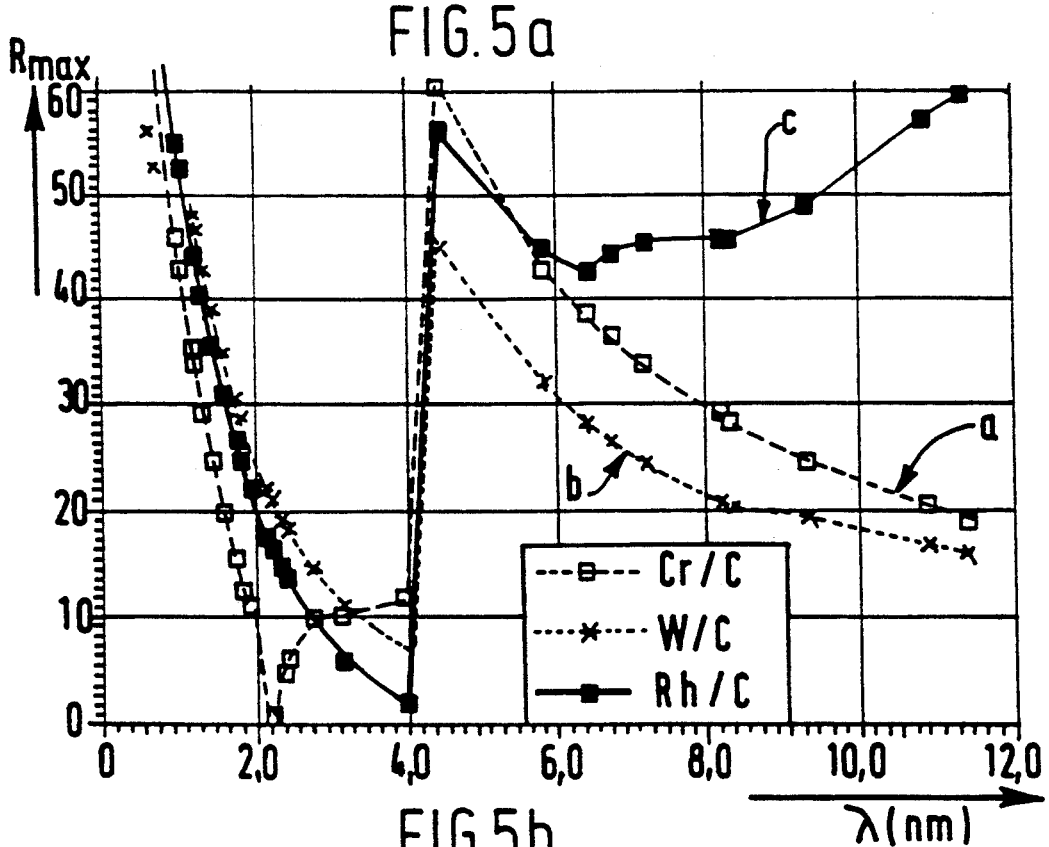
FIG. 5b represents, as a function of the wavelength $\lambda$, the maximum reflectivity $R_{max}$ of the pairs Cr-C (curve a), W-C (curve b) and Rh-C (curve c)

The distribution of maximum reflectivity $R_{max}$ which can be achieved at a given wavelength, with a material of a certain atomic number and a fixed spacer, is not a matter of chance. It is, in fact, directly dependent upon the position of the heavy element Me in relation to the closest emission threshold. This will be better understood on considering FIG. 5a, which shows the maximum reflectivity $R_{max}$ which can be achieved as a function of the atomic number Z of the heavy material Me associated with the carbon Sp spacer in the case of the Me-Sp two-layer system at $\lambda = 4.47$ nm. FIG. 5a also indicates the various absorption thresholds of the elements (K, L, M, N ...). It is seen that the materials Me which give the highest reflectivities are always located "above" the thresholds (K, L, M ...) with a shift of a few boxes in the periodic table.

These results will be interpreted by considering the specific case of the pair Rh-C (where Rh is the heavy material Me, and where C is the spacer light material Sp), by means of the curves of FIG. 2a and 2b which represent the real and imaginary indices respectively $\delta$ and $\beta$, of rhodium (Rh) and of carbon (C) as a function of the wavelength $\lambda$. According to the relation (1) given previously, it will be recalled that :

$$1 - \delta = Re\ \epsilon \quad (12)$$

$$\beta = Im\ \epsilon \quad (13)$$

FIG. 2a and 2b also show the M5 level of rhodium and the K$\alpha$ level of carbon. Precisely at the M5 level (located at $\lambda = 3.0$ nm) and just above, the absorption of rhodium is significantly weakened on account of the transition, while its index increases suddenly. The absorption $\alpha$ of rhodium at $\lambda = 4.47$ nm is therefore relatively low, and its index contrast T relatively great ($T \approx 3.69$); this gives a potential reflectivity $R_{max}$ of 55.8% for the pair Rh-C (Table I, FIG. 4a and 4b).

In this step a), the study described hereinabove is possibly carried out for other Me-Sp pairs at other wavelengths $\lambda$ within the X-UV range, and then the following step is implemented :

b) a determination is made of *the increase* in maximum reflectivity attainable by constructing the stack of two heavy materials, a first heavy material Me$_1$ for the layer 11, a second heavy material Me$_2$ for the layer 12, and a light spacer material Sp for the layer 13 forming the three-layer system according to the invention.

Each heavy material, Me$_1$, Me$_2$, forms together with the spacer Sp a pair :

Me$_1$- Sp

Me$_2$- Sp already studied in the course of the step a), and which may be referenced by a point on the isoreflectivity curves of FIG. 4a.

An ($\alpha$, T) pair corresponds pair. Thus, to
(Me$_1$- SP) there corresponds ($\alpha_1$, T$_1$)
(Me$_2$- SP) there corresponds ($\alpha_2$, T$_2$)

The determination of the increase in reflectivity is made by using on the one hand the relations (8) and (9) giving $\alpha_1$ and $\alpha_2$, and on the other hand the relations (10) and (11) giving T$_1$ and T$_2$.

After this a value ($\alpha_1$, T$_1$) is fixed, corresponding to a first pair Me$_1$-Sp and the values ($\alpha_2$, T$_2$) are varied corresponding to the possible second pairs Me$_2$-Sp within the same range ($\alpha$, T) that is to say $$0 \leq \alpha \leq 100$$

$$0 \leq T \leq 5$$

In order to provide a better understanding of this second step of the process for selecting materials, three examples are described hereinbelow :

EXAMPLE 1

Figure 6A:
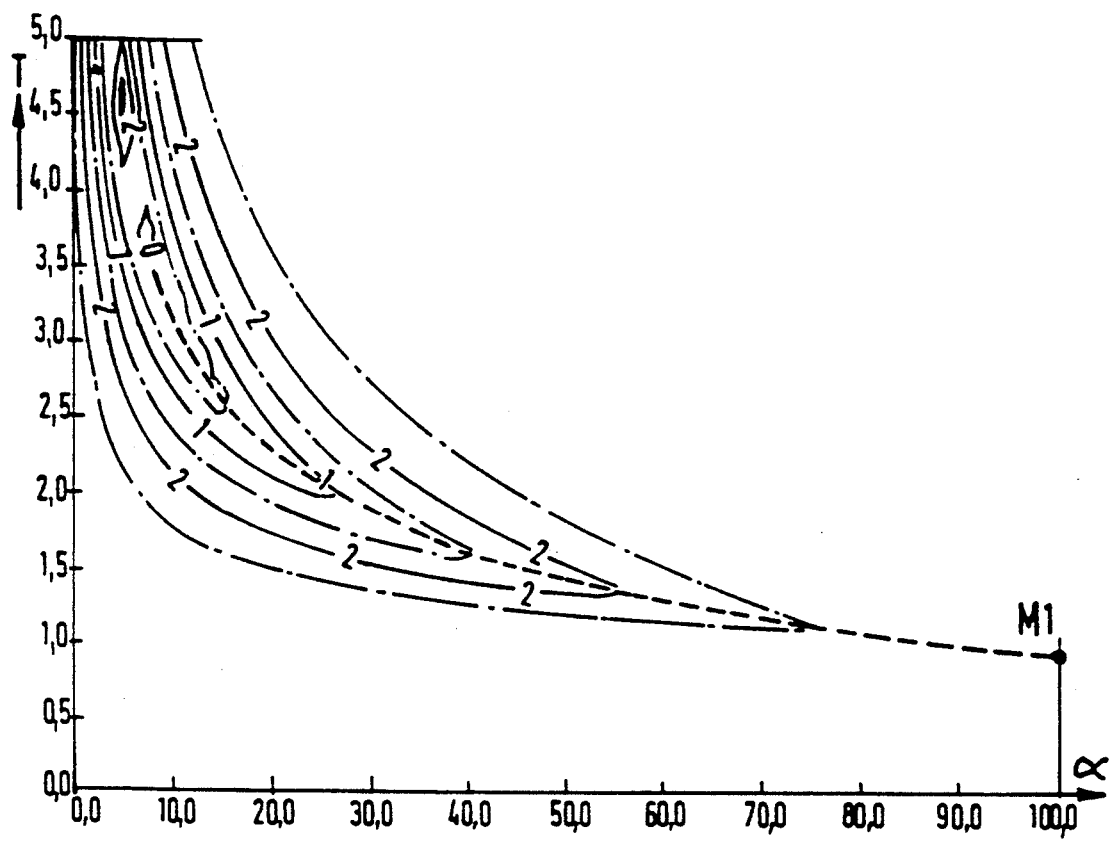
FIG. 6a, 6b and 6c represent, in the $(\alpha, T)$ plane, the curves of the increase in isoreflectivity of Me-carbon pairs at $\lambda = 4.47$ nm.

This example is illustrated by FIG. 6a; a selection is made of so-called first pairs of respectively heavy and light materials Me$_1$-Sp, the parameters ($\alpha_1$, T$_1$) of which will be fixed so as to be represented in a concrete form by points close to the point M$_1$ of FIG. 4a. As has been stated previously, this applies to the pairs such as

| | |
|---|---|
| W—C | Pt—C |
| Os—C | Au—C |
| Ir—C | at $\lambda = 4.47$ nm. |

The point M$_1$ in this example is on the line of isoreflectivity 50% with :
$\alpha_1$ high
T$_1$ low Under these conditions, a point ($\alpha_2$, T$_2$) of the plane, corresponding to so-called second pairs Me$_2$-Sp of materials, entirely fixes the index values of the three-layer system. This representation permits demonstration of the zones ($\alpha_2$, T$_2$) of the plane which lead to an increase in reflectivity in relation to the case where use is made only of a two-layer system composed of the materials Me$_1$-Sp: characterized by ($\alpha_1$, T$_1$) and represented by the points close to M$_1$.

FIG. 6a shows lines of increase of isoreflectivity in relation to the line of isoreflectivity 50%, considering this reflectivity as the maximum reflectivity with the better one of the cases incorporating two materials. This representation is made with an increment of 1% in relation to 50%, that is to say 2% in relation to 100% of maximum reflectivity. It is found that there is a large range where a significant increase in the reflectivity is observed, it being possible for this increase to reach 6%, in this specific example in relation to 50%, that is to say a relative increase of 12%.

This increase occurs for pairs ($\alpha_2$, T$_2$) corresponding to points "remote" from the point M$_1$ and relatively close to the line of isoreflectivity 50% on which the point M$_1$ is situated.

Thus, the greatest increase in reflectivity is obtained when the following conditions are fulfilled :
the heavy material Me$_1$ to form the lower layer 11 of the three-layer system exhibits :
high $\alpha_1$
low T$_1$
the heavy material Me$_2$ to form the following layer 12 of the three-layer system, or intermediate layer, exhibits :

$\alpha_2 < \alpha_1$ $T_2 > T_1$ moreover, the three materials $Me_1$, $Me_2$ and Sp exhibit potential reflectivities which are close to one another.

Figure 7A:
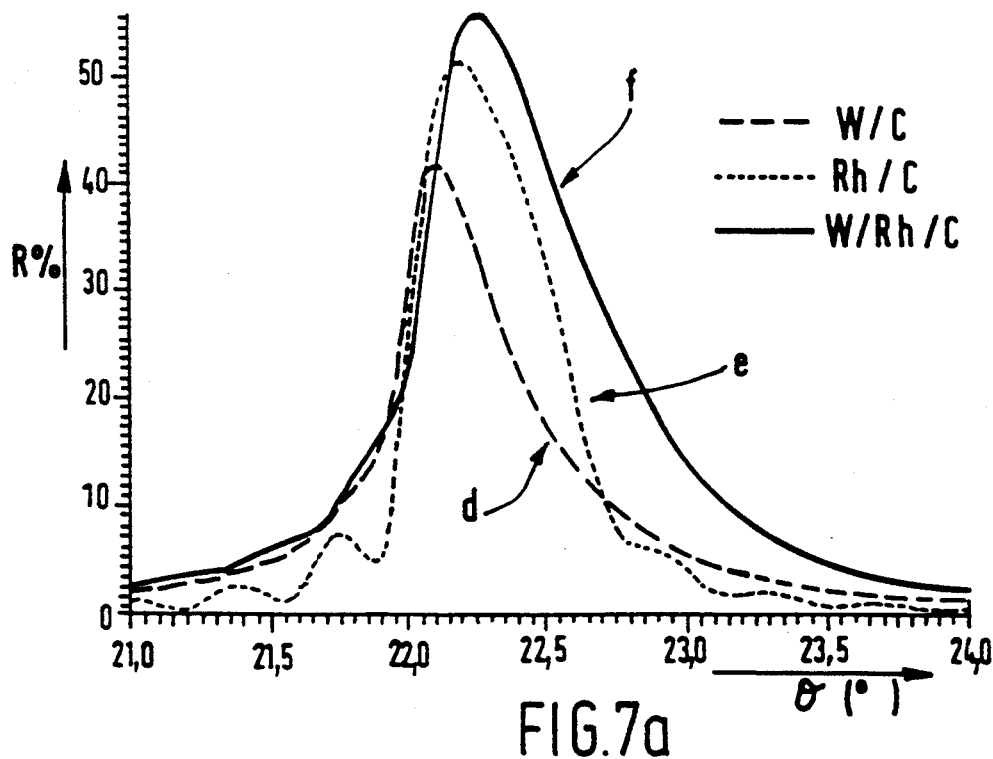
FIG. 7a represents, as a function of the angle of incidence $\theta$, the reflectivity R of the pair W-C (curve d), of the pair Rh-C (curve e) and of the three-layer system W/Rh/C in this stacking order (curve f)
Figure 7B:
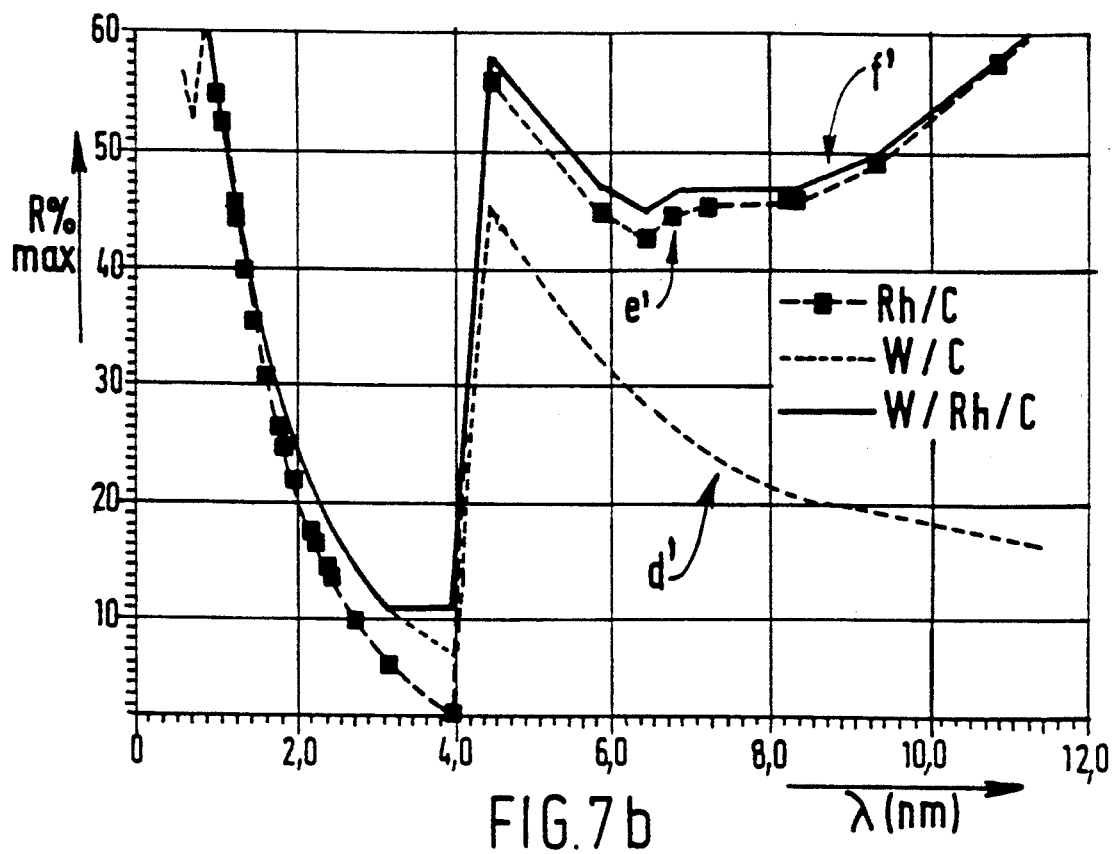
FIG. 7b represents respectively, as a function of the wavelength A, the maximum reflectivity $R_{max}$, of the same systems (curves d', e' and f')
Figure 7C:
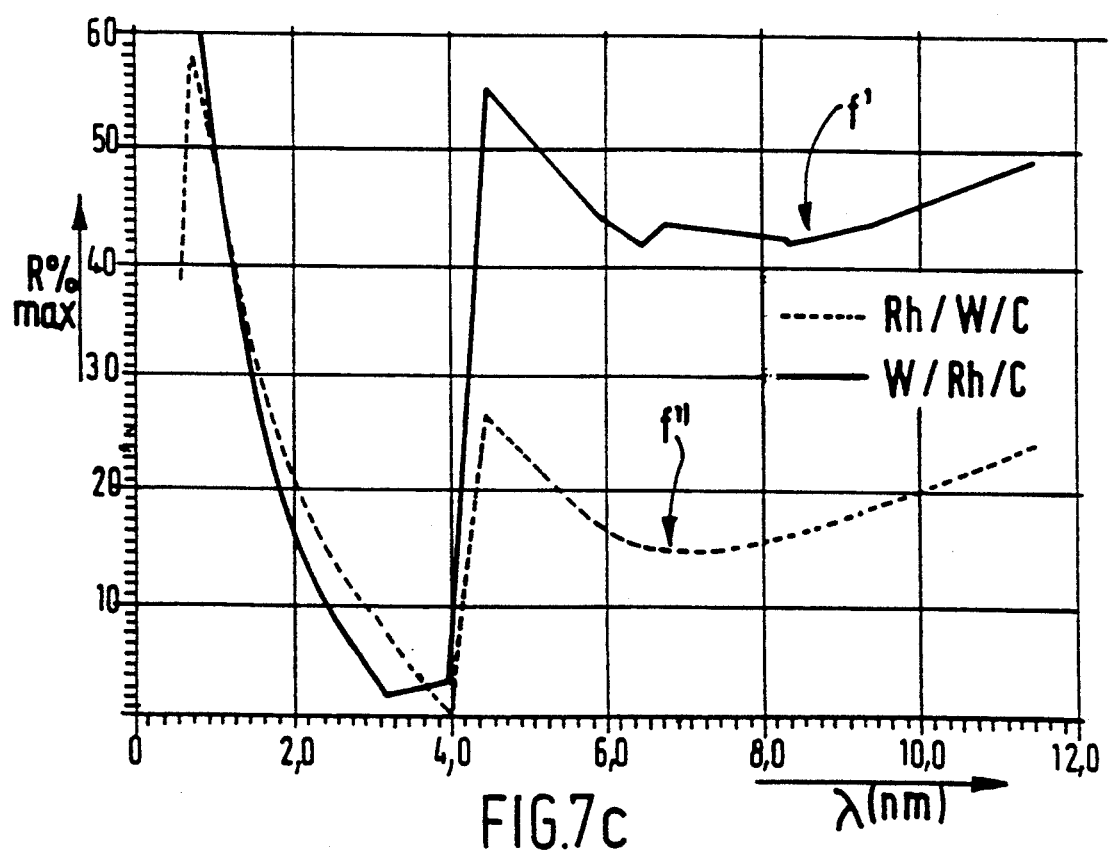
FIG. 7c represents, on the one hand, the maximum reflectivity of the three-layer system W/Rh/C in this order (curve f') and, on the other hand, the maximum reflectivity of the three-layer system Rh/W/C stacked in this order (curve f''), as a function of the wavelength $\lambda$.

Accordingly, the sense of stacking of the layers is a very significant factor. Experiments were carried out involving selecting a three-layer system W/Rh/C which complies with these conditions. The increase in reflectivity expected was obtained, as is shown in FIG. 7a and 7b. Following this, experiments were carried out involving the inversion of the stack of layers, that is to say by constructing the material $Me_1$ on the heavy material $Me_2$, the spacer Sp (in this case carbon) in all cases forming the upper layer, that is to say the stack Rh/W/C : in this case a reduction in reflectivity was found, as is shown in FIG. 7c.

In the example of the stack W/Rh/C The maximum reflectivity of W/C was $R_{max}=44.71$ (Table I).

The maximum reflectivity of Rh/C was $R_{max}=55.81$ (Table I).

The theoretical maximum reflectivity will be $R_{max}=57.80$ (Table II).

Under the conditions of this Example I, it is also possible to mention the good performance levels which may be expected from the stack Os/Sb/C (where Os is $Me_1$, Sb is $Me_2$ and C is the spacer Sp) For the pair Os-C, $\alpha_1=80$, $T_1=0.88$, $R_{max}=46.2\%$ For the pair Sb-C, $\alpha_2=1$, $T_2=3$, $R_{max}=44.9\%$ and for the stack Os/Sb/C in this order $R_{max}=52.2\%$ that is to say, an improvement in reflectivity of 12.5% in relation to the better one of the two pairs.

EXAMPLE 2

Figure 6B:
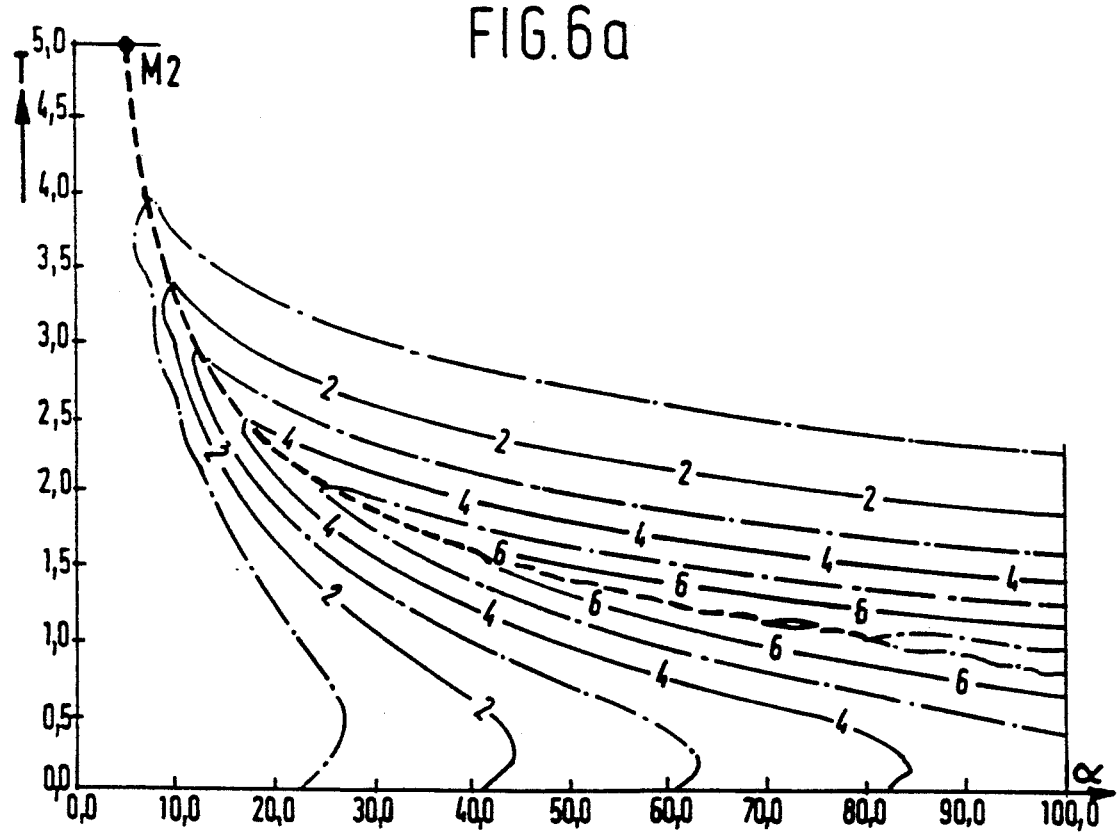

This example is illustrated by FIG. 6b. A selection is made of so-called second pairs of respectively heavy and light materials $Me_2$-Sp, the parameters $(\alpha_2, T_2)$ of which are fixed so as to be represented in a concrete form by points close to the point $M_2$ of FIG. 4a. As has been stated previously, this applies to pairs such as :

| Ti—C | Rh—C |
| Cr—C | Mn—C | at $\lambda=4.47$ nm.

The point $M_2$ is on the line of isoreflectivity 50% with, in a general way :
$T_2$ high
$\alpha_2$ low In order to fix the index values of the three-layer system, it is necessary on this occasion to determine points $(\alpha_1, T_1)$ of the plane, corresponding to so-called first pairs $Me_1$-Sp of materials which lead to an increase in reflectivity in relation to the case where use is made only of the two-layer system $Me_2$-Sp.

FIG. 6b shows lines of increase in isoreflectivity in relation to the line of isoreflectivity 50%, considering the better one of the cases incorporating two materials. This representation is made as in FIG. 6a, with an increment of 1% in relation to 50%.

In this case also, there is a large range in which an increase in reflectivity is observed. This increase takes place for pairs $(\alpha_1, T_1)$ which are "remote" from the point $M_2$ and relatively close to the line of isoreflectivity 50% on which $M_2$ is situated.

As previously, an increase in reflectivity is observed when a three-layer system is formed by stacking two heavy materials $Me_1$, $Me_2$ successively, surmounted by a spacer Sp which is carbon in the case of FIG. 6b, such that :

$\alpha_2 < \alpha_1$ $T_2 > T_1$ and such that the three materials exhibit potential reflectivities which are close to one another.

EXAMPLE 3

Figure 6C:
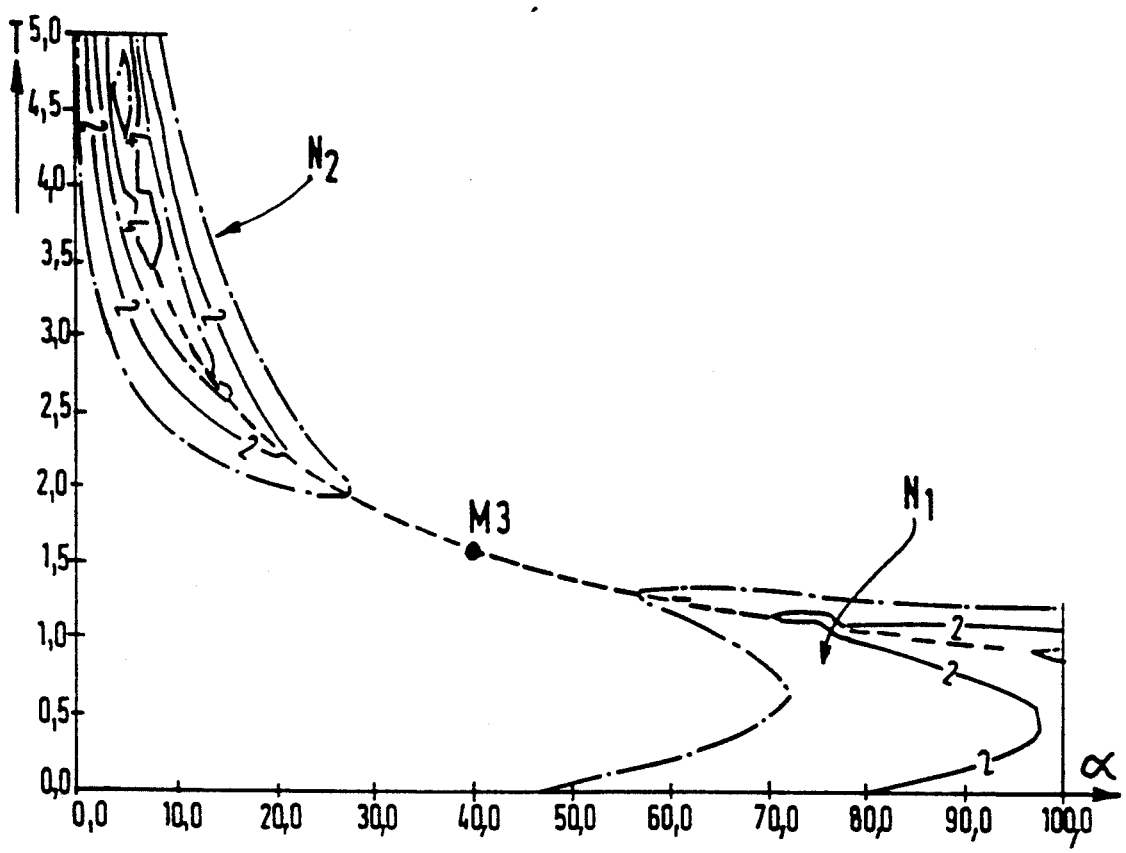

This example is illustrated by FIG. 6c. In a first case, it is possible to choose to fix the heavy material $Me_2$ of the intermediate layer 12 forming with carbon C a pair of intermediate characteristics $(\alpha_2, T_2)$ represented by the point $M_3$ on the line of isoreflectivity 50%; the increase in reflectivity which is desired will be obtained by selecting the heavy material $Me_1$ to construct the first layer of the three-material layer system from among those which form with the carbon of pairs, the characteristics $(\alpha_1, T_1)$ of which are located within the region $N_1$ with $\alpha_2 < \alpha_1$ $T_2 > T_1$ In a second case, it is possible to choose to fix the heavy material $Me_1$ of the lower layer 11 of the three-layer system to form together with carbon C a pair of intermediate characteristics $(\alpha_1, T_1)$ represented by the point $M_3$ on the line of isoreflectivity 50%. The increase in reflectivity which is desired will be obtained by selecting the heavy material $Me_2$ to construct the intermediate layer 12 from among those which form together with the carbon of pairs, the characteristics $(\alpha_2, T_2)$ of which are located within the region $N_2$, still with $\alpha_2 < \alpha_1$ $T_2 > T_1$ The best results are obtained when the points $(\alpha_1, T_1)$ and $(\alpha_2, T_2)$ are in the vicinity of the same isoreflectivity line.

It is possible to repeat these curves of FIG. 4a, 4b, 6a, 6b and 6c with other pairs, notably comprising another spacer Sp, and at another X-UV wavelength. The theoretical results remain in accordance with the results presented hereinabove and the practical embodiments follow the expected theoretical results, while nevertheless remaining in all cases slightly short, if the materials selected exhibit an interdiffusion or thick interfaces.

According to the invention, in order to increase the reflectivity, it will then be possible to make a selection from among a plurality of possible candidates for one or the other of the heavy materials $Me_1$, $Me_2$, selecting that or those which are within the ranges advocated for the purpose of obtaining the theoretical increase in reflectivity and which furthermore, in practice, are technologically more compatible, exhibit less interdiffusion, or interfaces of improved quality, or are quite simply easier to use to construct layers of strict and repetitive given thickness.

EXAMPLE 4

Assuming that carbon is the spacer material Sp and the wavelength λ=4.47 nm, it has been possible to establish, by superposing FIG. 4a and 4b that the best candidate at this wavelength was the pair Cr-C, with $\alpha \approx 16$
$T \approx 3.8$
$R_{max} = 60.41\%$ theoretically:

However, the results obtained in practice are in all cases lower. In order to improve these results, according to the teaching of the invention, it will be possible to form, for the purpose of constructing X-UV multilayer mirrors, systems such as those which are given by way of example in Table III.

EXAMPLE 5

Another good candidate was the pair Rh-C with

| $\alpha \approx 13$ | |
|---|---|
| $T \approx 3.7$ | $R_{max} = 55.81$ |

It has been seen that very good results were obtained by forming the three-layer system :

W/Rh/C with $R_{max} \approx 57.80$ as well as very good technological qualities.

Table II gives the theoretical results which it is possible to approach by combining heavy materials which are suitable and stacked in the proper sense, using the pair Rh-C.

The person skilled in the art is in a position to determine, by utilizing the teaching of the present invention, numerous three-layer systems which are suitable for constructing multilayer mirrors of a specified wavelength or within a specified range of wavelengths.

With reference to FIG. 7a, which shows the reflectivity (on the ordinate) as a function of the angle of incidence θ, it will be noted that the peak obtained is broader than for a two-layer system. This is very favorable for certain applications, since the quantity of integrated light is greater.

FIG. 8a to 8d permit an understanding, in physical terms, of the origin of the increase in reflectivity in a three-layer system in relation to the better one of the two pairs which may form a two-layer system which composes it.

Figure 8A:
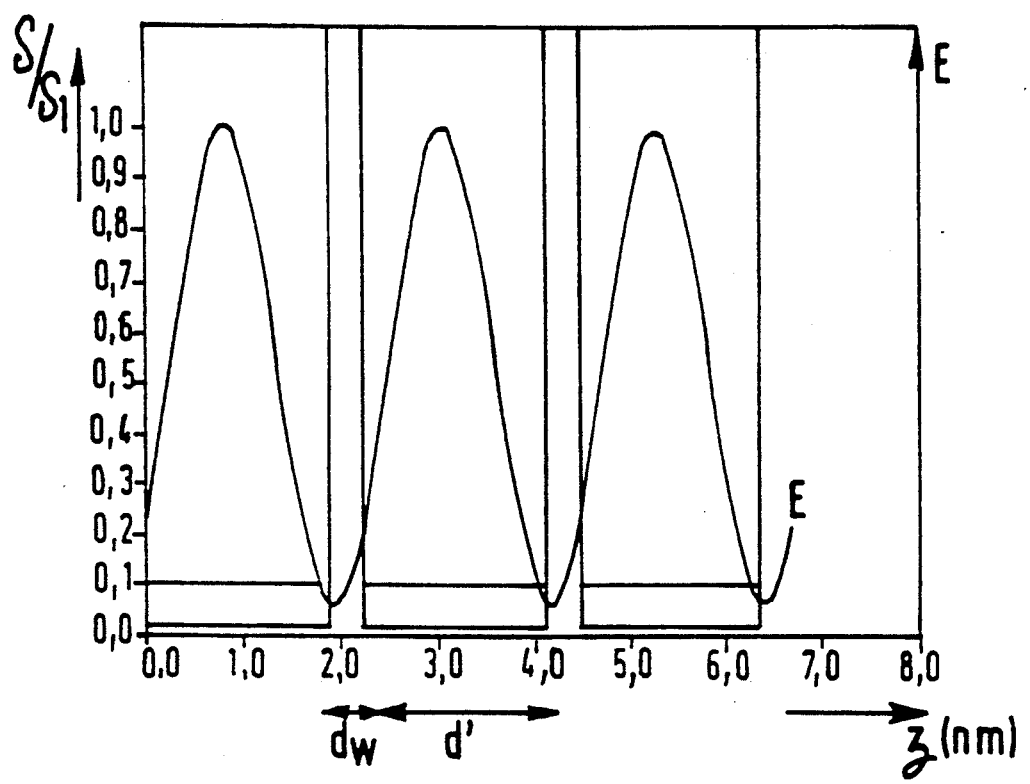
FIG. 8a and 8b represent the variation of energy E, as a function of the thickness z in stacks of two-layer systems W-C and Rh-C respectively, as well as the real-index ratios of the materials.

FIG. 8a shows the development of the energy E in an actual multilayer mirror consisting of tungsten-carbon (W-C) two-layer systems, as well as the ratio δ/δ₁ of the real indices of the two materials as a function of the thickness Z traversed by the light.

Figure 8B:
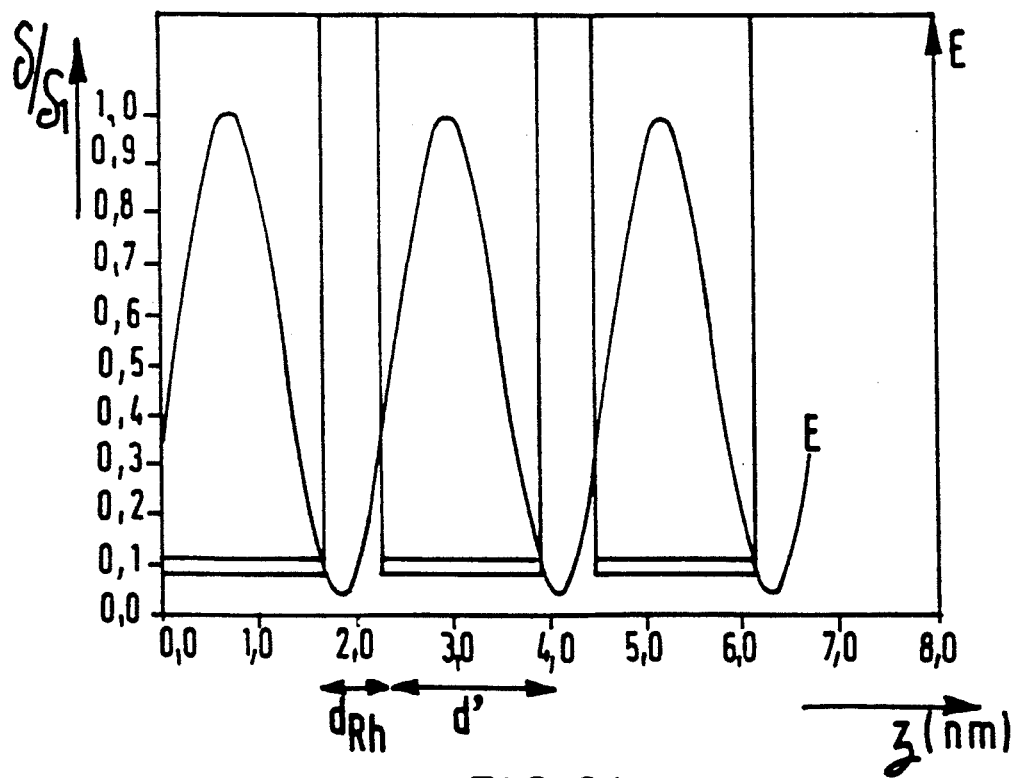

FIG. 8b shows the same development when the two-layer system is rhodium-carbon (Rh-C).

The absorption contrast $\alpha \approx 75$ is greater in the W-C system than is the Rh-C system ($\alpha \approx 12$). The result of this is that the index profile is optimum when, in these systems, the thickness $d_W$ of the layer of W is significantly less than that $d_{Rh}$ of the layer of Rh, d' representing the thickness of the carbon layer.

Figure 8C:
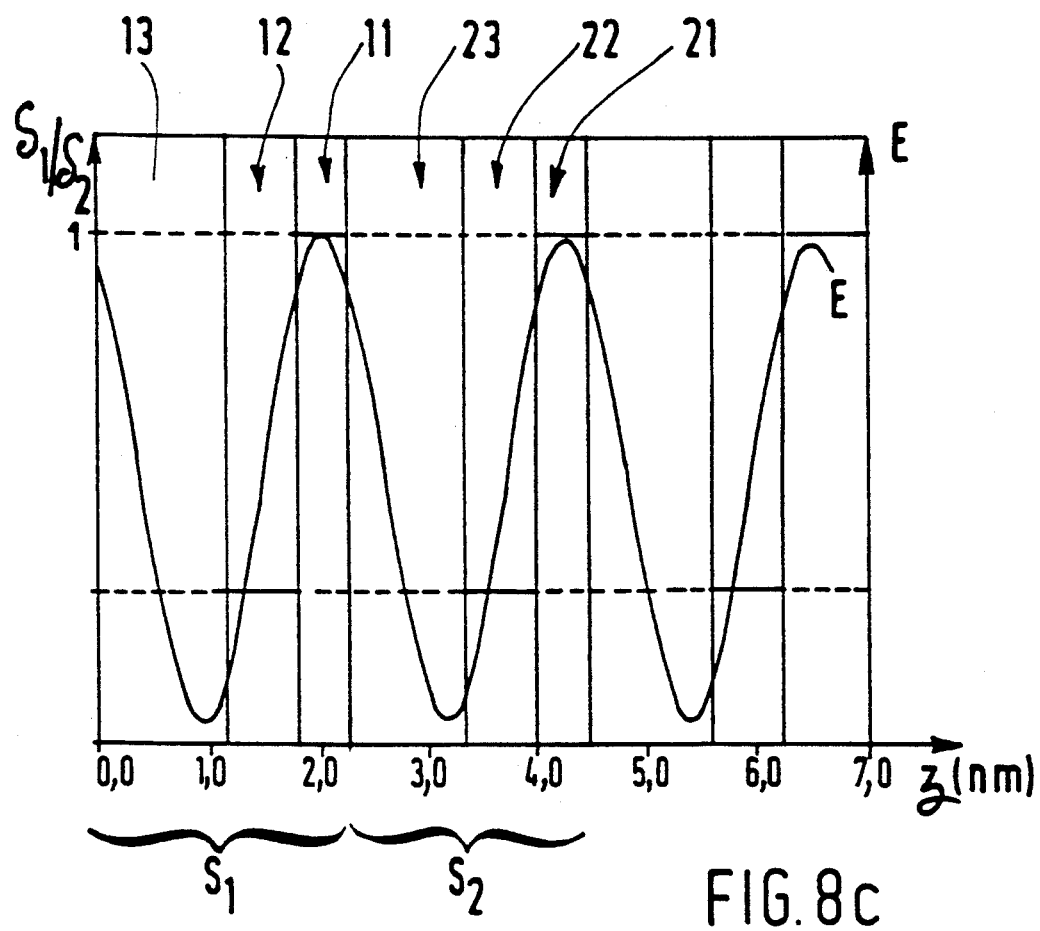
FIG. 8c represents, superimposed, the realindex profiles of a three-layer system stacked in the favorable direction, and the variations of the energy within this system, as a function of the thickness z traversed by the light.

FIG. 8c shows the same development when the system is a three-layer system, in which the layers are stacked in the sense advocated by the teaching of the invention : the energy maxima are located in the reflecting layer and the minima in the absorbing layer. The real index profiles $\delta_2/\delta_1$ have been superimposed to show the effect of the stacking of the heavy materials on the quantity of energy reflected.

Figure 8D:
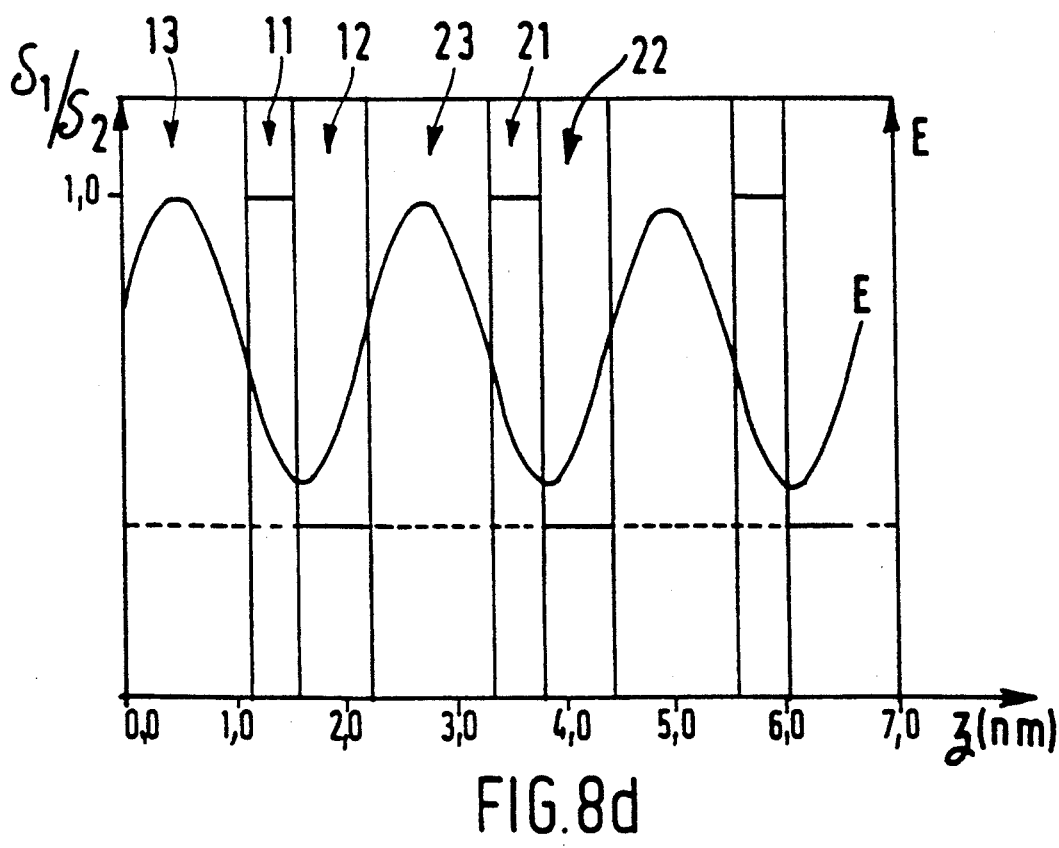
FIG. 8d represents the curves of the same variables, when the materials of the three-layer system are stacked in an unfavorable sense.

FIG. 8d shows the same development in a three-layer system in which the two heavy materials are on the contrary stacked in "the wrong sense", as shown by the profile of the real indices which has been superimposed on the energy curve.

The energy maxima are located outside the reflecting layer and the reflectivity is considerably reduced as a result thereof.

The technological construction of a multilayer mirror also requires the knowledge of the optimal number of systems $S_1 \ldots S_n$ to approach the theoretical maximum reflectivity. This number $N_{opt}$ may be determined by computation using the general knowledge possessed by the person skilled in the art. It is given in particular cases in Tables I, II and III, for a normal incidence.

A construction process for forming the multilayer mirrors described hereinabove may include the radio-frequency atomisation (rf atomisation) of the selected materials, on a substrate. rF atomisation consists in applying an alternating voltage to a target in order to atomise the material thereof on a substrate. This method permits operation using very widely differing layer growth rates of 0.001 nm/s to 10 nm/s. A plurality of different targets may be disposed within one and the same structure subjected to a basic vacuum of the order of or better than $10^{-7}$ Torr. The specimen is placed alternately under each target, for example by rotations effected in a few seconds. A system of shutters may cover or uncover the specimen in order to subject it to or to withdraw it from the atomisation of a material. Such a system permits control of the depositing times and thus the thicknesses with a high degree of accuracy.

In the illustrative embodiments which have been set forth hereinabove in the description of the invention, reference has been made especially to systems having carbon as spacer.

Reference will also be made to boron carbide C₄B which has a density slightly lower than that of carbon, and thus potential performance levels which are of greater benefit close to the absorption thresholds of boron and of carbon. Furthermore, an effect of smoothing of this compound with tungsten (W) has been experimentally observed and is known to the person skilled in the art. The sense of stacking optimised according to the invention is W/Rh/B₄C and an increase in reflectivity which is beneficial is observed within the range :

6.76 nm < λ < 11.4 nm

The W-Rh interfaces are virtually ideal. The Rh-B₄C interfaces are slightly inferior, but the performance levels of the mirror incorporating three-layer systems are nevertheless better than those obtained with the best one of the two-layer systems, which is Rh/B₄C.

TABLE I

λ = 4,47 nm, Spacer = carbon.

| Materials | β | R$_{max}$ (%) | N$_{opt}$ |
|---|---|---|---|
| Li/C | 0.487 | 11.90 | 2742 |
| Be/C | 0.299 | 43.14 | 711 |
| B/C | 0.234 | 38.40 | 689 |
| F/C | 0.400 | 46.85 | 882 |
| Al/C | 0.242 | 42.21 | 639 |
| Si/C | 0.238 | 38.63 | 690 |
| Ca/C | 0.421 | 11.72 | 2085 |
| Sc/C | 0.349 | 39.81 | 884 |
| Ti/C | 0.160 | 43.15 | 587 |
| V/C | 0.278 | 56.65 | 470 |
| Cr/C | 0.250 | 60.41 | 394 |
| Mn/C | 0.242 | 59.48 | 399 |
| Fe/C | 0.224 | 58.70 | 395 |
| Co/C | 0.209 | 58.66 | 386 |
| Ni/C | 0.199 | 58.43 | 382 |
| Cu/C | 0.197 | 56.84 | 399 |
| Zn/C | 0.214 | 52.74 | 489 |
| Ge/C | 0.208 | 42.20 | 600 |
| As/C | 0.199 | 41.17 | 607 |
| Sr/C | 0.234 | 22.66 | 985 |
| Y/C | 0.218 | 23.98 | 921 |
| Zr/C | 0.208 | 29.94 | 796 |
| Nb/C | 0.197 | 30.12 | 780 |
| Mo/C | 0.204 | 29.46 | 800 |
| Ru/C | 0.259 | 55.13 | 471 |
| Rh/C | 0.269 | 55.81 | 472 |
| Pd/C | 0.236 | 44.33 | 600 |
| Ag/C | 0.240 | 46.66 | 570 |
| Cd/C | 0.281 | 50.38 | 564 |
| Sb/C | 0.292 | 44.93 | 667 |
| Ba/C | 0.383 | 46.02 | 849 |
| La/C | 0.284 | 46.50 | 628 |
| Hf/C | 0.176 | 41.42 | 583 |
| Ta/C | 0.163 | 43.60 | 544 |
| W/C | 0.154 | 44.71 | 524 |
| Re/C | 0.152 | 46.06 | 505 |
| Os/C | 0.152 | 46.27 | 503 |
| Ir/C | 0.153 | 43.36 | 541 |
| Pt/C | 0.157 | 42.77 | 551 |
| Au/C | 0.165 | 39.54 | 602 |
| B$_4$C/C | 0.249 | 35.30 | 761 |

TABLE II

λ = 4,47 nm, Spacer = carbon

| Materials | B | C | R$_{max}$ (%) | N$_{opt}$ |
|---|---|---|---|---|
| Rh/C | 0.269 | | 55.80 | 472 |
| Rh/Li/C | 0.252 | 0.184 | 56.76 | 489 |
| Rh/F/C | 0.219 | 0.141 | 58.10 | 487 |
| B/Rh/C | 0.003 | 0.262 | 55.79 | 477 |
| Al/Rh/C | 0.024 | 0.248 | 55.85 | 474 |
| Si/Rh/C | 0.026 | 0.245 | 55.67 | 478 |
| Rh/Sc/C | 0.257 | 0.016 | 55.82 | 482 |
| Rh/Ti/C | 0.235 | 0.049 | 56.08 | 475 |
| Mn/Rh/C | 0.220 | 0.030 | 59.56 | 400 |
| Fe/Rh/C | 0.178 | 0.072 | 59.56 | 395 |
| Co/Rh/C | 0.163 | 0.084 | 60.09 | 383 |
| Ni/Rh/C | 0.151 | 0.095 | 60.39 | 377 |
| Cu/Rh/C | 0.141 | 0.109 | 59.62 | 389 |
| Zn/Rh/C | 0.097 | 0.163 | 57.13 | 448 |
| Ge/Rh/C | 0.057 | 0.215 | 56.16 | 467 |
| As/Rh/C | 0.058 | 0.214 | 56.27 | 466 |
| Sr/Rh/C | 0.035 | 0.251 | 55.96 | 476 |
| Y/Rh/C | 0.042 | 0.246 | 56.07 | 475 |
| Zr/Rh/C | 0.039 | 0.244 | 56.08 | 469 |
| Nb/Rh/C | 0.046 | 0.240 | 56.22 | 465 |
| Mo/Rh/C | 0.043 | 0.242 | 56.13 | 468 |
| Pd/Rh/C | 0.034 | 0.238 | 55.88 | 473 |
| Ag/Rh/C | 0.035 | 0.234 | 55.87 | 476 |
| Rh/Cr/C | 0.003 | 0.245 | 60.39 | 397 |
| Hf/Rh/C | 0.070 | 0.201 | 56.81 | 455 |
| Ta/Rh/C | 0.075 | 0.192 | 57.38 | 443 |
| W/Rh/C | 0.077 | 0.188 | 57.80 | 433 |
| Re/Rh/C | 0.080 | 0.184 | 58.12 | 423 |
| Os/Rh/C | 0.080 | 0.184 | 58.15 | 422 |
| Ir/Rh/C | 0.074 | 0.193 | 57.67 | 437 |
| Pt/Rh/C | 0.073 | 0.195 | 57.48 | 441 |
| Au/Rh/C | 0.066 | 0.206 | 56.98 | 455 |

TABLE III

λ = 4,47 nm, Spacer = carbon

| Materials | B | C | R$_{max}$ (%) | N$_{opt}$ |
|---|---|---|---|---|
| Cr/C | 0.250 | | 60.40 | 394 |
| Cr/Li/C | 0.235 | 0.190 | 61.18 | 408 |
| B/Cr/C | 0.015 | 0.239 | 60.42 | 397 |
| Al/Cr/C | 0.013 | 0.237 | 60.40 | 401 |
| Si/Cr/C | 0.015 | 0.239 | 60.42 | 397 |
| Cr/Sc/C | 0.244 | 0.009 | 60.40 | 399 |
| Ti/Cr/C | 0.055 | 0.200 | 61.11 | 384 |
| Mn/Cr/C | 0.114 | 0.134 | 60.46 | 395 |
| Fe/Cr/C | 0.113 | 0.133 | 60.98 | 384 |
| Co/Cr/C | 0.119 | 0.124 | 61.56 | 372 |
| Ni/Cr/C | 0.118 | 0.123 | 61.95 | 364 |
| Cu/Cr/C | 0.104 | 0.138 | 61.57 | 373 |
| Zn/Cr/C | 0.053 | 0.195 | 60.54 | 396 |
| Ge/Cr/C | 0.027 | 0.227 | 60.49 | 396 |
| As/Cr/C | 0.032 | 0.222 | 60.53 | 397 |
| Sr/Cr/C | 0.027 | 0.237 | 60.47 | 400 |
| Y/Cr/C | 0.032 | 0.237 | 60.54 | 395 |
| Zr/Cr/C | 0.028 | 0.232 | 60.51 | 398 |
| Nb/Cr/C | 0.034 | 0.228 | 60.58 | 399 |
| Mo/Cr/C | 0.031 | 0.230 | 60.54 | 399 |
| Pd/Cr/C | 0.014 | 0.236 | 60.41 | 397 |
| Ag/Cr/C | 0.011 | 0.238 | 60.40 | 400 |
| Cr/Ba/C | 0.221 | 0.100 | 61.45 | 400 |
| Hf/Cr/C | 0.046 | 0.210 | 60.78 | 391 |
| Ta/Cr/C | 0.055 | 0.200 | 61.07 | 384 |
| W/Cr/C | 0.059 | 0.195 | 61.31 | 379 |
| Re/Cr/C | 0.062 | 0.187 | 61.45 | 381 |
| Os/Cr/C | 0.063 | 0.185 | 61.46 | 383 |
| Ir/Cr/C | 0.057 | 0.197 | 61.27 | 383 |
| Pt/Cr/C | 0.055 | 0.200 | 61.17 | 385 |
| Au/Cr/C | 0.048 | 0.210 | 60.72 | 391 |

What is claimed is:

1. Device of the mirror type in the wavelength range of X-UV rays, comprising a periodic stack, on a support, of a system of superimposed layers, which system includes a lower layer of a first heavy element reflecting at the wavelengths of the mirror, and an upper spacer layer of a light element which has low optical absorption at said wavelengths, in combination therewith said system of superimposed layers comprising, between the lower layer and the upper layer, an intermediate layer of a second heavy element reflecting at said wavelengths to form a three-layer system, said first and second heavy elements being constructed to form together with the spacer element first and second pairs, the first pair having greater absorption at said wavelengths and exhibiting a ratio of contrast of real and complex indices lower than the second pair, the heavy element of the first pair being formed as the lower layer of the three-layer system, the intermediate layer being composed of the heavy element of the second pair.

2. Device according to claim 1 wherein the heavy elements and the light element are selected so that the potential reflectivities of said first and second pairs of the three-layer system are equivalent.

3. Device according to claim 2 wherein the light element is selected from the group consisting of carbon (C) and boron carbide (B$_4$C).

4. Device according to claim 2 wherein the heavy element of the intermediate layer is selected from among those which exhibit, together with the heavy element of the lower layer and the light element of the upper layer, the lowest interdiffusion and a minimum interface roughness.

5. Device according to claim 4 wherein the light element is selected from the group consisting of carbon (C) and boron carbide ($B_4C$).

6. Device according to claim 5 wherein the three-layer system is composed of the stack W-Rh-C in this order.

7. Device according to claim 5 wherein the three-layer system is composed of the stack Os-Sb-C in this order.

8. Device according to claim 5 wherein the three-layer system is selected from the group consisting of:
Cr-Li-C;
Ti-Cr-C;
Ni-Cr-C;
W-Cr-C;
Pt-Cr-C;
Au-Cr-C; and
Os-Cr-C
the materials of each stack being stacked in the order shown from left to right.

9. Device according to claim 1 wherein the heavy element of the intermediate layer is selected from among those which exhibit, together with the heavy element of the lower layer and the light element of the upper layer, the lowest interdiffusion and a minimum interface roughness.

10. Device according to claim 9 wherein the light element is selected from the group consisting of carbon (C) and boron carbide ($B_4C$).

11. Device according to claim 1 wherein the light element is selected from the group consisting of carbon (C) and boron carbide ($B_4C$).

12. Device according to claim 11, wherein the three-layer system is composed of the stack W-Rh-C in this order.

13. Device according to claim 11, wherein the three-layer system is composed of the stack Os-Sb-C in this order.

14. Device according to claim 11, wherein the three-layer system is selected from any one of the stack comprising:
Cr-Li-C;
Ti-Cr-C;
Ni-Cr-C;
W-Cr-C;
Pt-Cr-C;
Au-Cr-C; and
Os-Cr-C
these mteirals being stacked in this order.

15. Device according to claim 11, wherein the three-layer system is composed of W-Rh-$B_4C$ stacked in this order.

* * * * *